(12) United States Patent
Carr et al.

(10) Patent No.: US 7,508,561 B2
(45) Date of Patent: Mar. 24, 2009

(54) DEFORMABLE MIRRORS

(75) Inventors: Michael A. Carr, 15 Lenape La., Skillman, NJ (US) 08558; James E. Gunn, Princeton, NJ (US)

(73) Assignee: Michael A. Carr, Skillman, NJ (US)

( * ) Notice: Subject to any disclaimer, the term of this patent is extended or adjusted under 35 U.S.C. 154(b) by 48 days.

(21) Appl. No.: 11/973,504

(22) Filed: Oct. 9, 2007

(65) Prior Publication Data

US 2008/0088902 A1 Apr. 17, 2008

Related U.S. Application Data

(60) Provisional application No. 60/850,726, filed on Oct. 11, 2006.

(51) Int. Cl.
*G02B 26/08* (2006.01)

(52) U.S. Cl. .................... 359/198; 359/224; 359/846

(58) Field of Classification Search ................. 359/198, 359/224, 846, 849
See application file for complete search history.

(56) References Cited

U.S. PATENT DOCUMENTS

| 4,944,580 | A | * | 7/1990 | MacDonald et al. | ......... 359/849 |
| 2005/0102807 | A1 | * | 5/2005 | Takeuchi et al. | .......... 29/25.35 |

* cited by examiner

*Primary Examiner*—James Phan
(74) *Attorney, Agent, or Firm*—Henry I. Schanzer

(57) ABSTRACT

A deformable mirror (DM) embodying the invention includes a reflective layer attached to the front surface of a solid monolithic block of a ceramic material. A plurality of holes is drilled from the back surface with the top end of each hole being terminated a predetermined distance below the front surface. Conductors, functioning as actuators, are inserted into each hole to apply a localized electric field at the top end of the hole. Each one of the electric fields is used to create local deformation of the front surface of the block and the corresponding portion of the reflective layer.

11 Claims, 7 Drawing Sheets

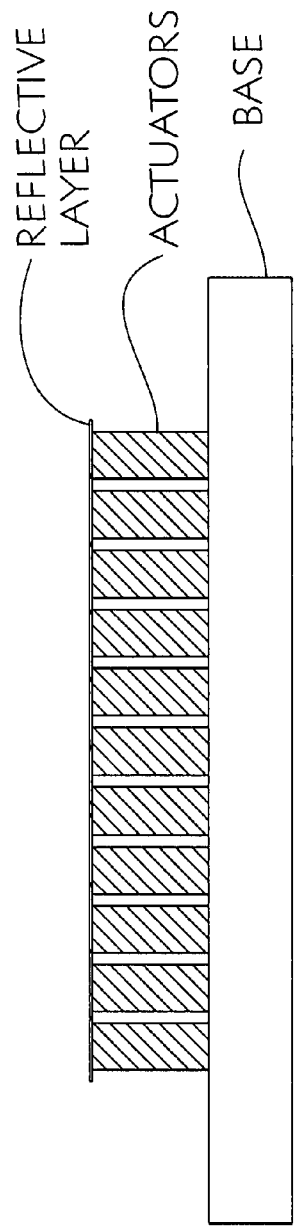
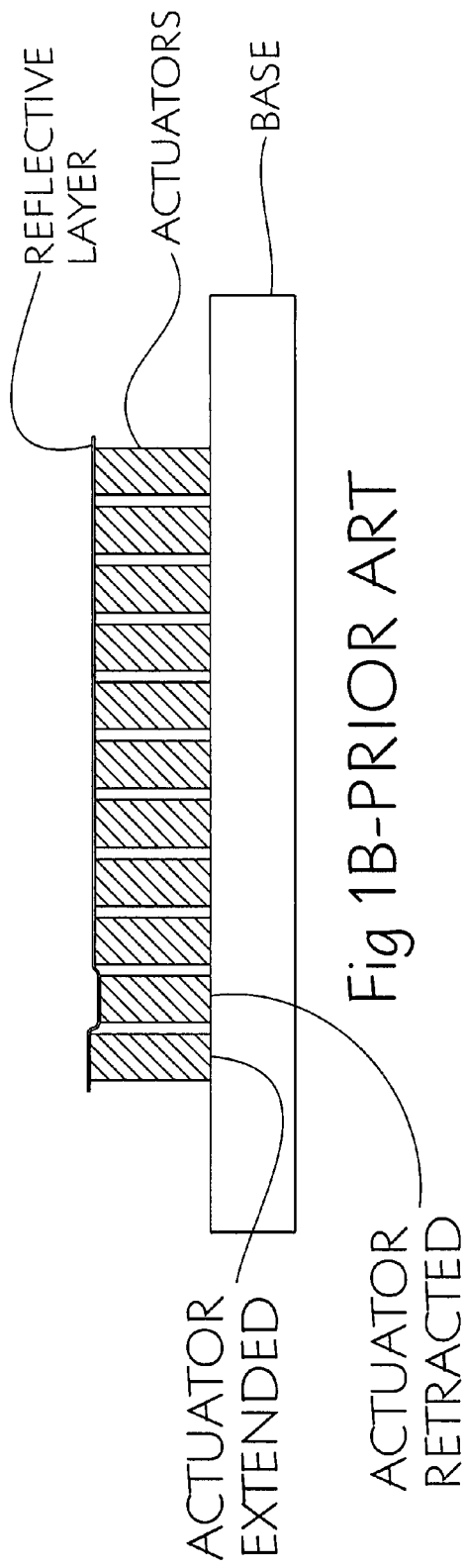

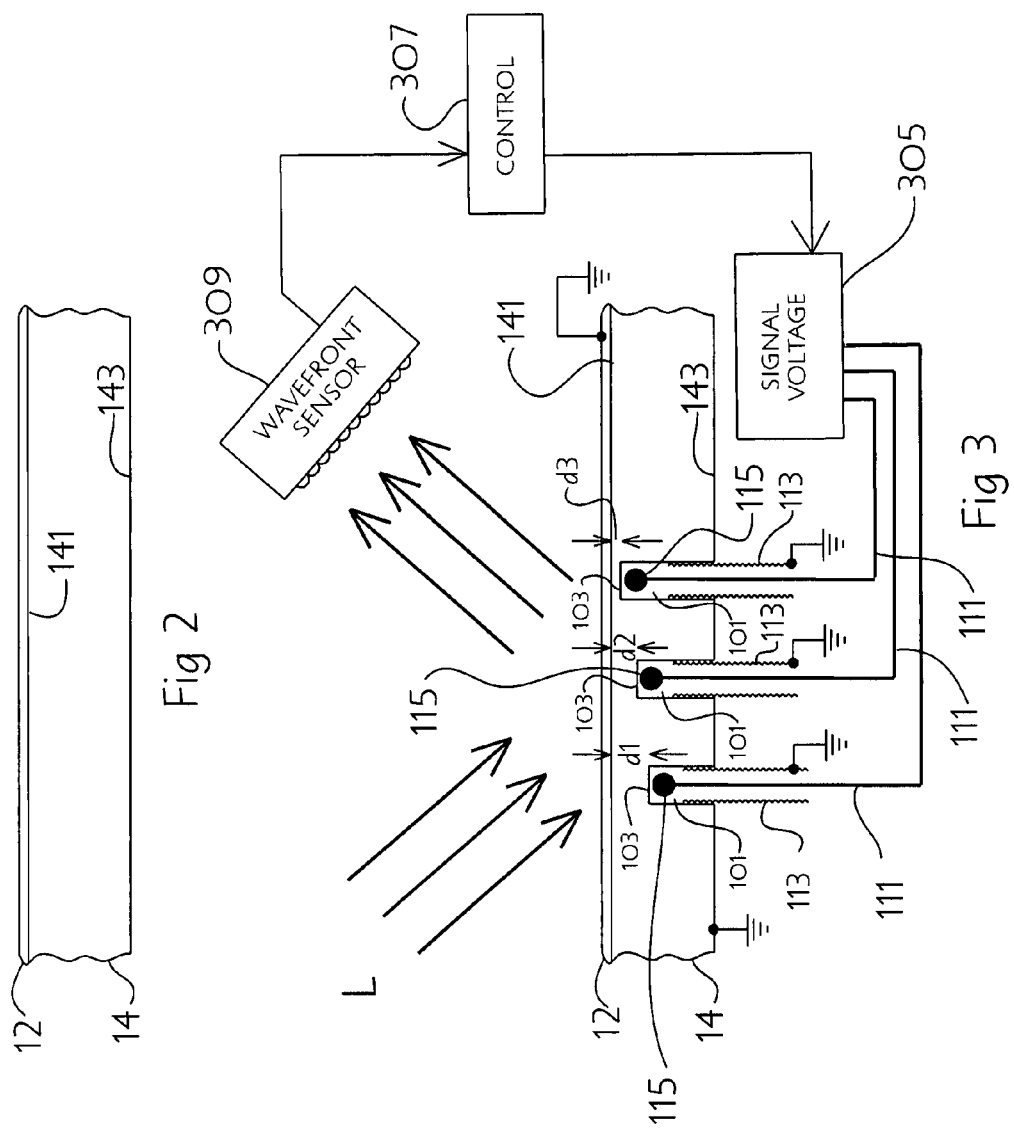

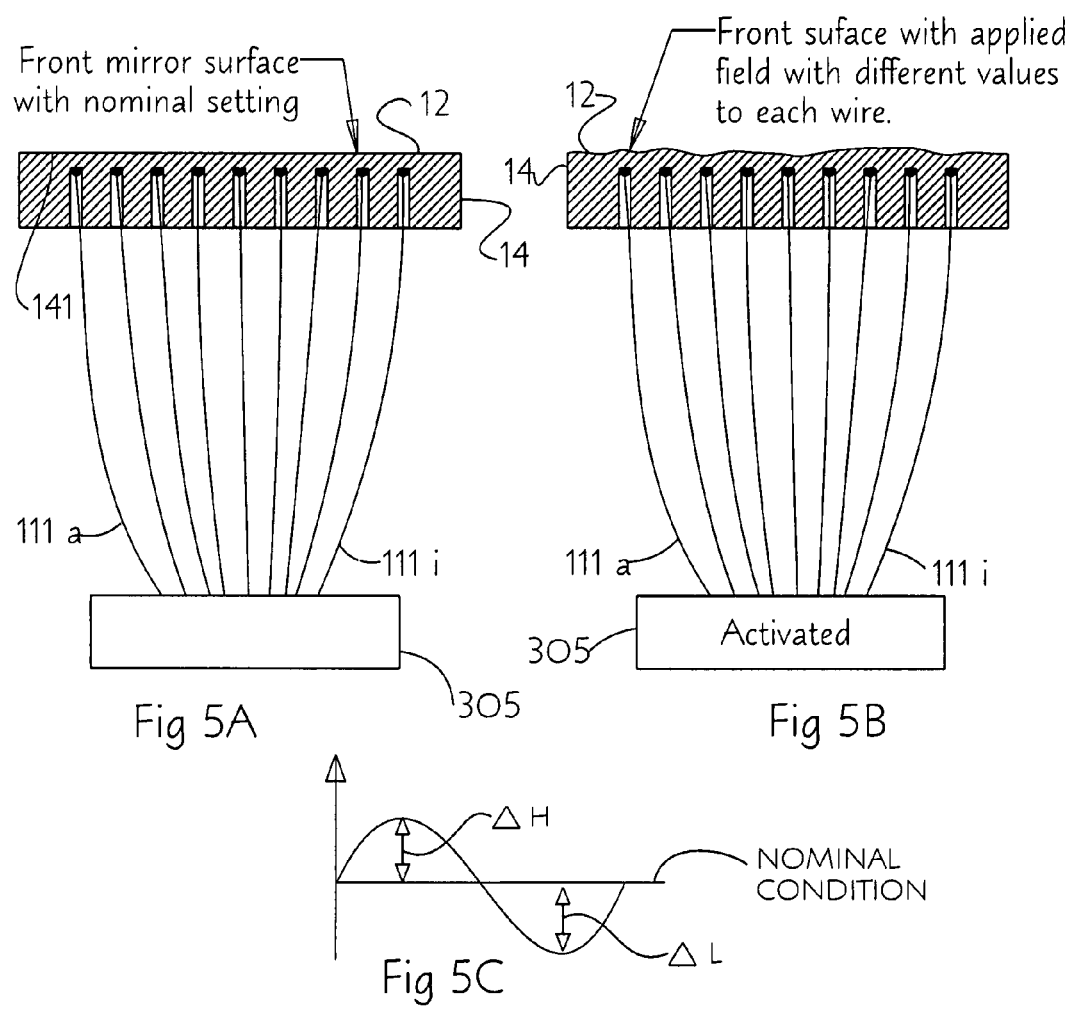

DEFORMABLE MIRRORS

This application claims priority from Provisional Application 60/850,726 filed Oct. 11, 2006 titled Self Deforming Mirror and which is incorporated herein by reference.

BACKGROUND OF THE INVENTION

This invention relates to adaptive optic (AO) systems and to the manufacture of deformable mirrors (DMs).

Deformable mirrors for reflecting an incoming wave front are generally formed to have a highly precise surface, which surface can be changed with high precision and control. FIGS. 1 and 1A show a known deformable mirror (DM). The mirror includes a thin reflective layer (membrane) overlying the top ends of an array of individual actuators. The bottom ends of the actuators are mounted on a base (substrate). By applying electrical signals to the actuators (which may be of the piezoelectric or electrostatic type), the actuators may be made to expand (extend or elongate) or retract (shrink or get smaller). This causes the portion of the reflective layer corresponding to an activated actuator to move up or down as shown in FIG. 1B. The movement of each actuator enables the mirror surface to move a portion of a wavelength to correctly reflect an incoming wave front. However, the manufacturing and assembly of these DMs is extremely delicate and is subject to many problems. As shown in FIGS. 1 and 1A, the bottom ends of the actuators (e.g., piezo blocks) need to be rigidly held in place on a back plane (substrate) and their top ends need to be properly aligned for the deposition thereon of the mirror membrane (reflective layer). The top end of each actuator is free to change length by pushing the attached mirror membrane upward or pulling it downward. As each actuator is energized, by the application of a signal which varies about a nominal signal value, the corresponding membrane portion is raised or lowered (per the orientation shown in FIGS. 1A and 1B) relative to the value corresponding to the nominal signal value.

These types of devices are expensive to manufacture. They use a thin membrane mirror surface as the active area. They are fragile and are subject to several failure modes when subjected to mechanical forces such as those found during launch conditions.

It is therefore desirable to have a robust device which can be made using standard manufacturing techniques.

SUMMARY OF THE INVENTION

A deformable mirror (DM) embodying the invention includes a solid monolithic block of a ceramic material which may be deformed (extended or retracted) when subjected to an electric field. The block of material has a front surface and a back surface. A reflective layer is applied to the front surface. A plurality of holes is drilled from the back surface with the top end of each hole being terminated a predetermined distance below the front surface. Conductors, functioning as actuators, are inserted into each hole to apply a localized electric field at the top end of the hole. The electric field due to each conductor is used to create local deformation of the front surface of the block and the corresponding portion of the reflective layer.

The ceramic material may be a solid block of piezo ceramic material. The solid block may be of arbitrary size and outer shape. The block may be formed to have roughly parallel front and back surfaces; but that is not a necessary condition for DMs embodying the invention. The front surface is designated as the mirroring or optically reflecting surface. Holes are drilled from the backside of the block ending below the front surface. Wires (electrodes) are inserted in the holes terminating at, or near, the head of the hole (just below the front mirror surface). Electric signals may be applied to the wires to cause the front surface to move (up or down) so as to conform to a desired shape in the specific location corresponding to the energized wire. That is, the electric signals enable the front surface to be locally deformed by means of electric fields induced by applying potentials to the set of electrodes.

The distance between the holes drilled into the back surface and the depth of each hole may vary over a wide range. Generally, but not necessarily, the holes are drilled through most of the thickness of the block of material so the distance between the head of the holes (top of the holes as shown in FIG. 3) to the front surface is of order of the hole spacing.

In one embodiment, the electrodes (conductors) are formed from a set of grounded-shield coaxial cables with metal balls or tips (which may be round, square and/or cylindrical) affixed to the center conductor. The electrodes so formed are inserted into the holes. The metal balls/tips may be affixed to the head (top) of the holes with conductive epoxy.

In operation, the form of the front surface is determined by varying the potentials on the set of electrodes. Each electrode controls the surface in its immediate vicinity with some form factor function, and can raise or lower the surface by raising or lowering its potential above or below a DC bias level.

Thus, a deformable mirror (DM) embodying the invention, which may be also referred to as a self deforming mirror (SDM), includes a solid mirror having a front surface for reflecting light; with the front surface being planar, concave or convex. The SDM may be formed from a solid monolithic block of PZT or similar ceramic of various shapes and sizes. Holes are drilled into the PZT backside surface, opposite the front mirror surface. The hole pattern including the diameter of the holes, the distance between holes, their location and depth may be varied to optimize the desired results. A hexagonal pattern is well suited for hole location because spacing may be the same for the entire pattern, creating image uniformity. However a user may prefer a different pattern to accommodate a specific application. This type of option is unique and open to many new possibilities.

A coax actuator wire may be inserted into each hole with the tip of the center wire conductor being affixed to the head (top end) of the hole (e.g., with electrically conductive epoxy).

BRIEF DESCRIPTION OF THE DRAWINGS

In the accompanying drawings, which are not drawn to scale, like reference characters denote like components.

FIGS. 1A and 1B are simplified cross sectional diagrams illustrating the prior art actuators and their functioning;

FIG. 2 is a simplified cross sectional diagram of a piezo ceramic block which may be used to practice the invention;

FIG. 3 is a simplified cross sectional and block diagram of a deformable mirror embodying the invention showing actuators which can be used to move (deform) the optical surface;

FIGS. 5A and 5B illustrate the deformability of the front surface of a piezo ceramic block in accordance with the invention;

FIG. 5C illustrates possible deformation (displacement) levels of the top surface in accordance with the invention.

DETAILED DESCRIPTION OF THE INVENTION

Figure 1:
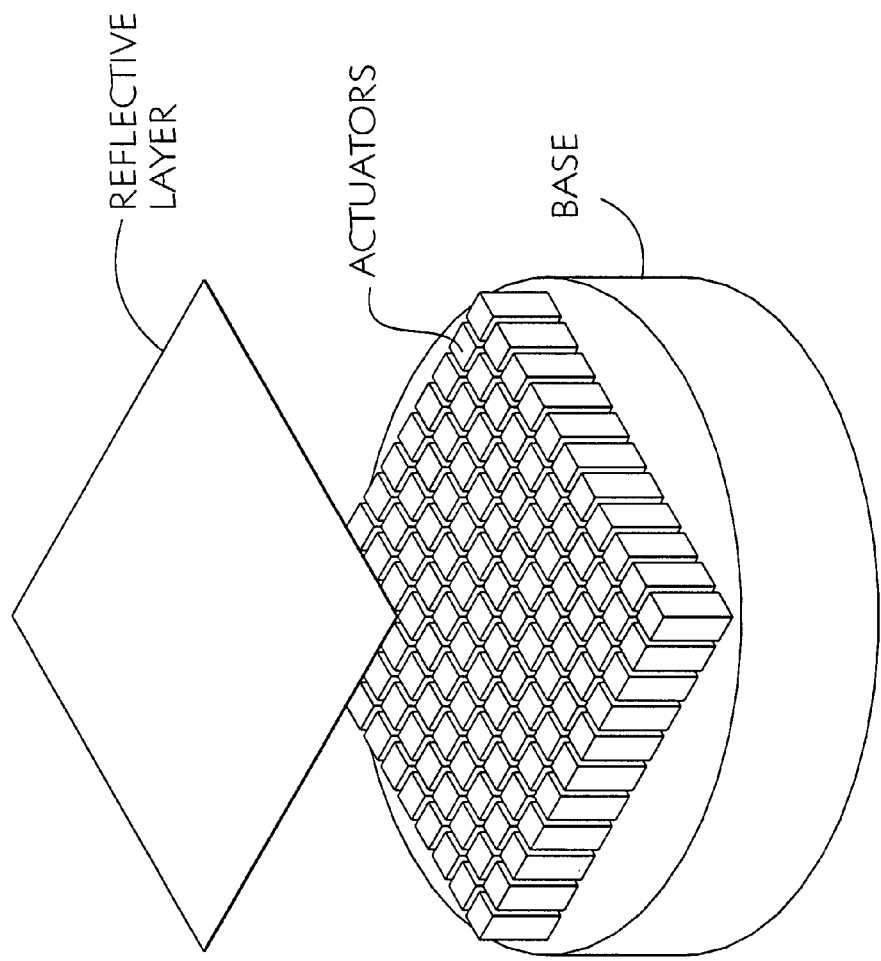
FIG. 1 is an isometric diagram illustrating a prior art structure.
Figure 4:
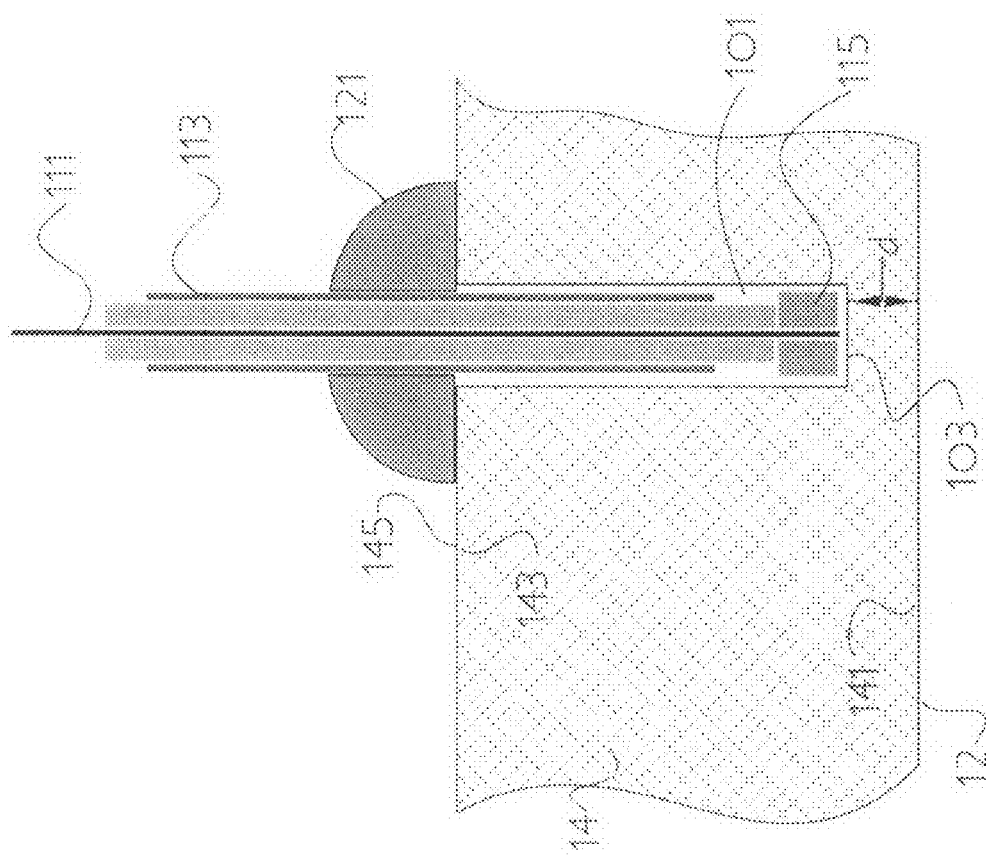
FIG. 4 is a simplified cross sectional block diagram of a wire inserted into a piezo ceramic block in accordance with the invention.

Referring to FIGS. 2, 3 and 4, a self deforming mirror (SDM) embodying the invention includes a solid, monolithic, piezo ceramic block 14 having a front surface 141 and a back surface 143. The front and back surfaces are shown to be generally perpendicular to each other (but this is not a necessary condition). An advantage of the present invention is that the shape of the back surface can be of any arbitrary configuration. The front surface 141 may be optically configured to have virtually any shape (e.g., it may be planar, spherical, aspheric, hyperbolic, conic, etc, and can be either concave or convex). A thin reflective metal coating 12 is applied to the front surface 141 to produce a reflective mirror using techniques suitable to optical coating of mirrors and specified wavelength.

Figure 4A:
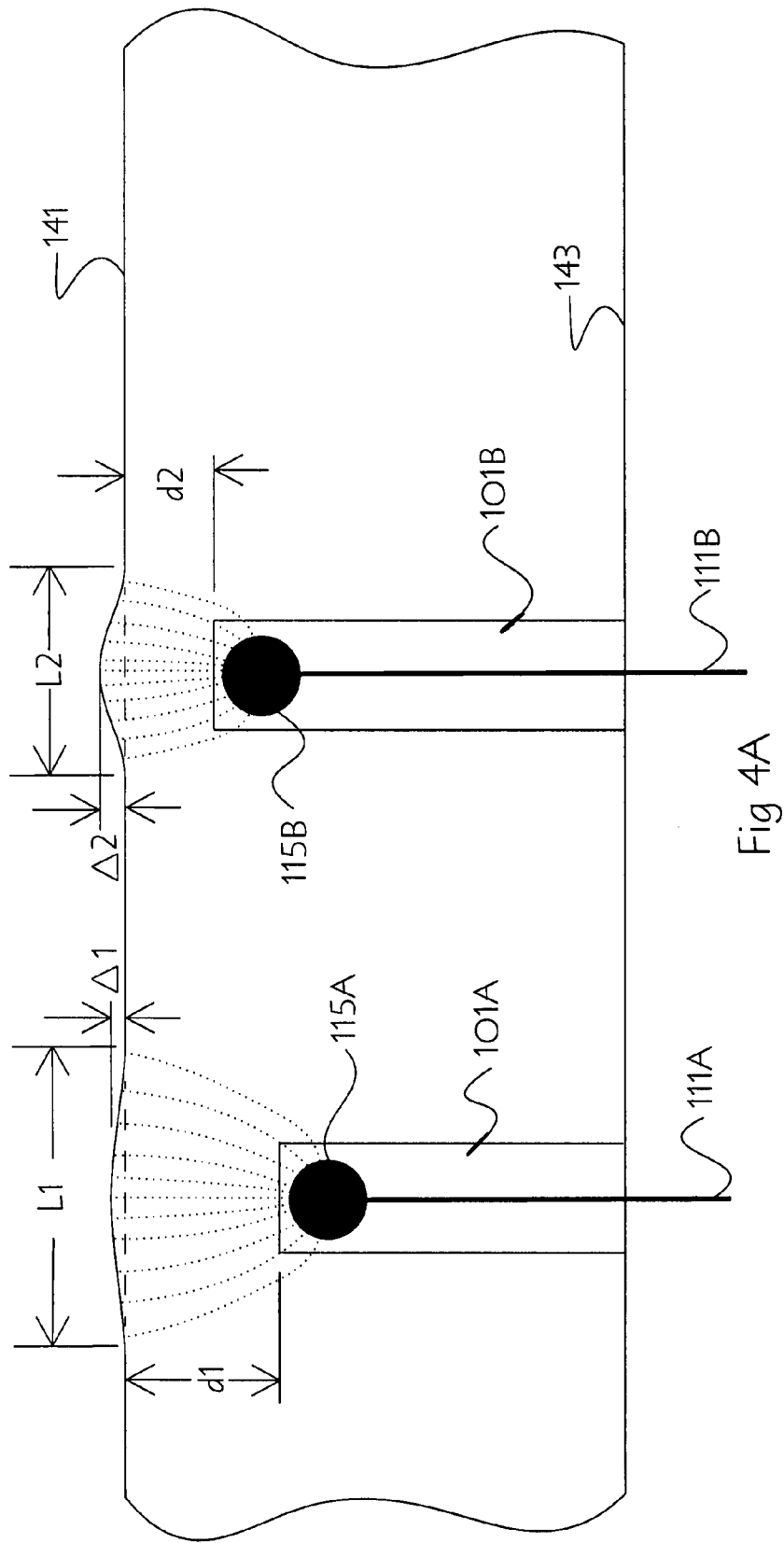
FIG. 4A is a diagram of a mirror surface deformation for different "root" thicknesses.
Figure 6:
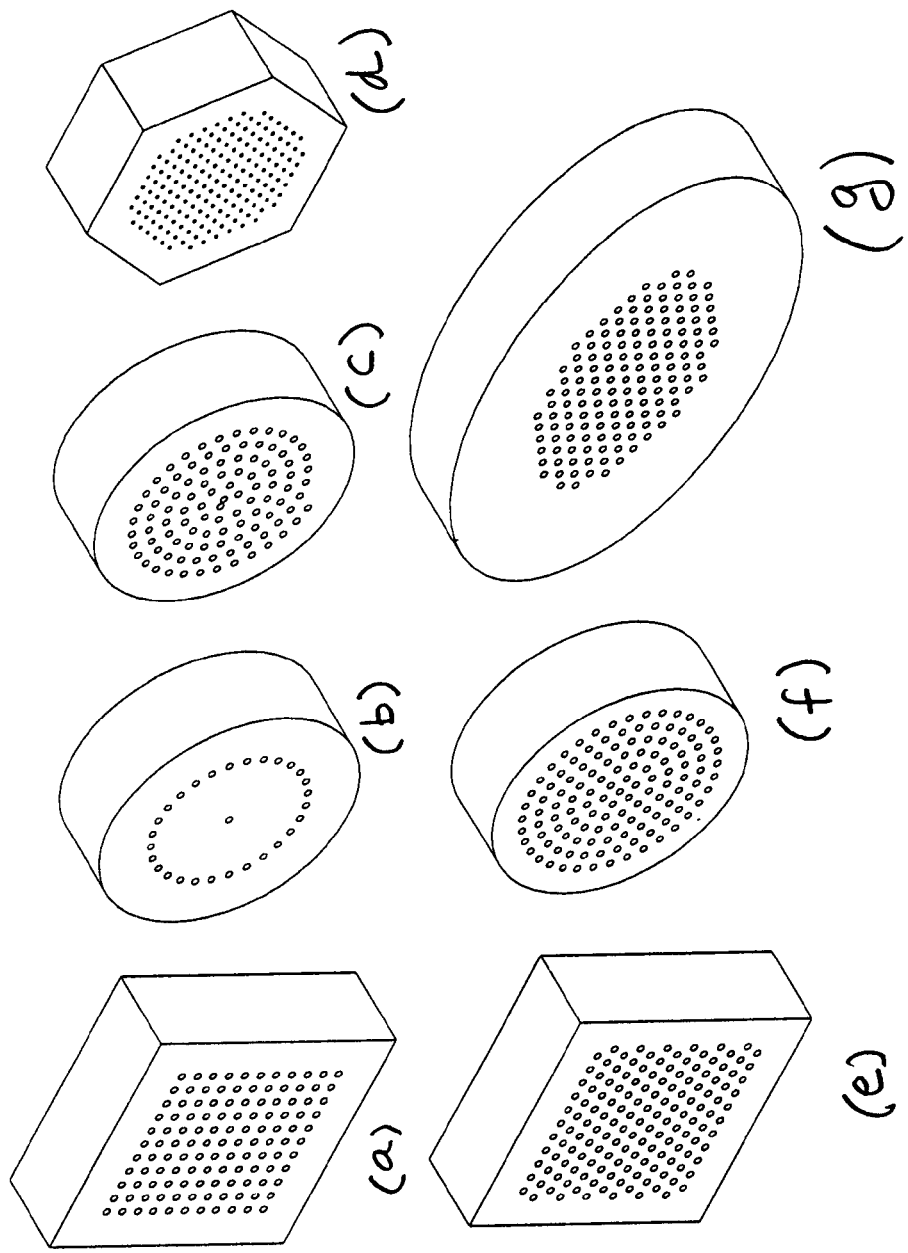
FIG. 6 includes isometric diagrams (a) through (g) illustrating hole patterns formed in the back side of piezo ceramic blocks and the many different shapes which a deformable mirror embodying the invention may have.

In an apparatus embodying the invention the actuators for deforming the front surface are formed by drilling holes 101 in the block 14 and inserting conductors 101 in the holes. Voltages applied to the conductors create electric fields which cause extension and retraction of selected points along the surface. Thus, holes or cavities 101 are formed by drilling from the back surface towards the front surface. (Any other suitable method for making a hole may be used to make the holes.) Thus, the open end of each hole, or cavity, lies along the back surface 143 and the closed or top end 103 of each hole is near the front surface 141. The diameter of each hole needs to be large enough to accommodate the insertion of a shielded wire (coax cable). The distance (d) between the top, or closed, end 103 of the hole 101 and the front surface 141 is also termed "root" thickness. FIG. 3 shows that the "root" distance (e.g., d1, d2, d3) may vary over a relatively large range. The root distance determines, in part, the amount of voltage that needs to be applied to deform the front surface and the shape of the deformity, as illustrated in FIG. 4A.

Each coaxial cable includes a conductor (wire) 111 surrounded by a shield 113, with each wire 111 terminated in, or with, a tip/bead 115. The tip/bead 115 may be ball shaped, or cubic or any rectangular solid or any other like shape. In one embodiment, the bead 115 was made of brass soldered to the wire conductor 111. However, any suitable conductive material may be used instead. The wire tip 115 is shown inserted into the cavity 101. An epoxy (which may be electrically conductive) may be used to secure the tip 115 to the top end 103 of the hole 101. In FIG. 4 the coax wire assembly is also shown secured to the back surface via a silver epoxy bump 121.

In the embodiments shown in FIGS. 3 and 4, the back side 143 is metallized with an electrically conductive material (e.g., silver, aluminum) 145. This permits the back surface to be electrically grounded. The electrically conductive and reflective front layer 12 is grounded and the wire shields 113 surrounding the conductors 111 are also grounded; (i.e., they are all returned to a point of fixed reference potential).

As shown in FIG. 3, each wire 111 is connected to a source of signal voltage generator 305 which is driven by a controller 307. Different signal voltages may be applied to the wires 111 to generate the electric fields which cause the top surface 141 corresponding to the wires to move up and/or down (assuming a vertical positioning as shown in FIG. 3) and the corresponding points along surface 12 to move in phase (and deform).

FIG. 3 also illustrates a mechanism for deforming the top surface. A light source 301 impinging on the top surface 12 is reflected as light rays 303 which may be sensed by a sensor 309. The outputs of sensor 309 may then be supplied to controller 307 which can cause electric signals to be applied to the various conductors. The amount and extent of deformation imparted to the surface may thus be changed, or may be fixed, with closed loop control.

FIG. 4A illustrates a relationship between the root thickness (di) and the contour (shape) of the deformation of the mirror surface. In the case of hole 101a, the top end of the hole terminates a distance d1 below the surface 141. In the case of hole 101b, the top end of the hole terminates a distance d2 below the surface 141. Assume that d1 represents a relatively large (deep or thick) root thickness d1. For this condition, the contour of the deformation tends to extend over a larger linear distance (e.g., L1) but its displacement (delta 1) relative to the horizontal is small (shallow). For the relatively small (thin) root thickness d2, the contour of the deformation tends to be extend over a smaller linear distance (e.g., L2) but its displacement (delta 2) relative to the horizontal is larger. The amplitude of the voltage applied to the conductors (e.g., 111a, 111b) can increase the amplitude and the area of the deformation.

It is significant that, in accordance with the invention, the deformation of the top surface 141 and the corresponding reflective layer 12 is smooth and continuous. That is, there is no sharp discontinuity in the elevation of the top surface and the reflective layer due to the energizing of the conductors (actuators). This is further illustrated in FIG. 5B which shows that the deformation of the front surface for different values of electrical signals is continuous along and over the surface of the reflective layer 12. Thus, FIG. 5A shows a condition which may be defined as the "nominal" condition for which the front surface 141 and the overlying reflective layer are fully planar. This condition may be produced during the manufacturing process and/or by the application of appropriate voltages from source 305 to establish a nominal level/value. FIG. 5B illustrates that the top surface 141 and the overlying reflective layer 12 may be deformed over the entire length (and area) of the device. FIG. 5C is intended to emphasize that the displacement (delta) of the top surface may rise above (delta H) or drop below (delta L) the nominal value.

FIG. 6(a) through (g) illustrate many different backside hole patterns and also show that the deformable mirrors may have different shapes.

What is claimed is:

1. A deformable mirror comprising:
    a block of piezoelectric material having a front surface and a back surface;
    a thin reflective layer formed on and extending over the front surface for providing a mirroring function;
    a pattern of N holes formed within the block, said N holes extending from the back surface toward the front surface and having a top end at a predetermined distance below the front surface;
    one conductor per hole, each conductor having two ends, one end of each conductor being inserted within each hole and terminating at the top end of its hole; and
    means for applying selected electrical signals to the other end of each conductor for causing the reflective layer to move up and down.

2. A deformable mirror as claimed in claim 1, wherein each conductor has a shield extending along the conductor and including means for connecting each shield to a point of reference potential.

3. A deformable mirror as claimed in claim 2, wherein a conductive layer is formed along the back surface and including means for connecting the back surface conductive layer to said point of reference potential.

4. A deformable mirror as claimed in claim 1, wherein each conductor is terminated in a tip, and wherein the tip is secured to the top of the hole.

5. A deformable mirror as claimed in claim 1, wherein said means for applying selected electric signals includes control means for applying selected voltages to the other end of said conductors.

6. A deformable mirror as claimed in claim 4, further including means for projecting a light beam onto the reflective mirror surface and means for sensing light reflected from the mirror and for supplying signals to said control means, said control means including means for processing signals corresponding to the reflected light and for providing corresponding signals to the conductors.

7. A deformable mirror as claimed in claim 1, wherein the deformations imparted to the thin reflective mirror due to the conductors are continuous.

8. A deformable mirror as claimed in claim 1, wherein the different holes terminate at different distances below the front surface.

9. A deformable mirror comprising:
- a block of ceramic material having a front surface and a back surface; said ceramic material being deformable when subjected to electrical signals;
- a thin reflective layer formed on, and extending over, the front surface of the block;
- a pattern of N holes formed within the block, said N holes extending from the back surface toward the front surface and having a top end at a predetermined distance below the front surface;
- one conductor per hole, each conductor having one end inserted within each hole and terminating at the top end of its hole and having another end; and
- means for applying selected electrical signals to the other end of each conductor for causing the reflective layer to move up and down.

10. A deformable mirror as claimed in claim 9 wherein the ceramic material is electrostrictive.

11. A deformable mirror as claimed in claim 9 wherein the deformations imparted to the thin reflective layer due to the conductors are continuous.

\* \* \* \* \*